United States Patent
Nishihata

(10) Patent No.: US 6,462,741 B1
(45) Date of Patent: Oct. 8, 2002

(54) METHOD AND APPARATUS FOR CREATING ANIMATION HAVING MOTION CHANGING WITH PASSAGE OF TIME AS DESIRED AND COMPUTER-READABLE RECORDING MEDIUM IN WHICH ANIMATION CREATING PROGRAM IS RECORDED

(75) Inventor: Minoru Nishihata, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/365,078

(22) Filed: Jul. 30, 1999

(30) Foreign Application Priority Data

Jul. 31, 1998 (JP) .......................................... 10-216640

(51) Int. Cl.$^7$ ............................................... G06T 15/70
(52) U.S. Cl. ..................... 345/473; 345/474; 345/475; 345/951
(58) Field of Search ............................... 345/473, 474, 345/475, 951

(56) References Cited

U.S. PATENT DOCUMENTS

| | | | | |
|---|---|---|---|---|
| 5,377,319 A | * | 12/1994 | Kitahara et al. | 345/473 |
| 5,606,655 A | * | 2/1997 | Arman et al. | |
| 5,719,786 A | * | 2/1998 | Nelson et al. | 345/473 |
| 5,746,605 A | * | 5/1998 | Kennedy | 345/473 |

FOREIGN PATENT DOCUMENTS

| | | |
|---|---|---|
| JP | 60-191366 | 9/1985 |
| JP | 4-324777 | 11/1992 |

OTHER PUBLICATIONS

"Macromedia DIRECTOR Technical Manual", written by Yoshiyuki Ohshige; published by Mizuki Shuppan. Mar. 20, 1994.

* cited by examiner

*Primary Examiner*—Mark Zimmerman
*Assistant Examiner*—Kimbinh T. Nguyen
(74) *Attorney, Agent, or Firm*—Dike, Bronstein, Roberts & Cushman; Timothy Carter Pledger; David G. Conlin

(57) ABSTRACT

A presenting time for an animation is determined as follows for each of a plurality of frames of the animation in passage of time at a prescribed speed which can be changed as desired. First, for each of the plurality of frames, a signal indicating a timing corresponding to a boundary between adjacent frames is applied. Then, in accordance with the applied timing indication signal, a presenting time is determined and recorded onto a medium corresponding to each frame. A producer operates a keyboard, mouse or the like to input the timing indication signal at an arbitrary timing. In addition, the timing indication signal is input at a timing determined in accordance with the regenerated guide track information while guide track information (information to be referenced for identifying the aforementioned boundary) is regenerated at a regeneration rate in accordance with a prescribed speed.

12 Claims, 15 Drawing Sheets

FIG.3
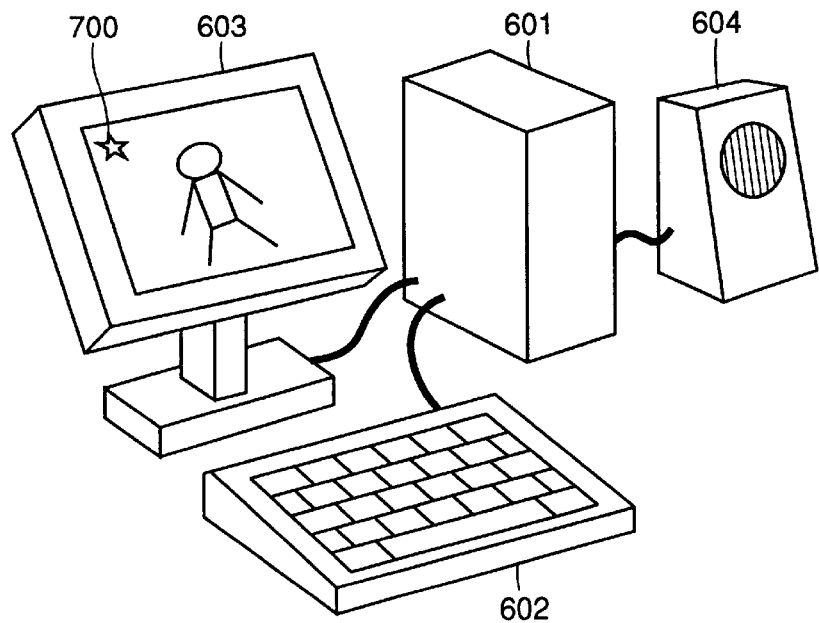
FIG.4A
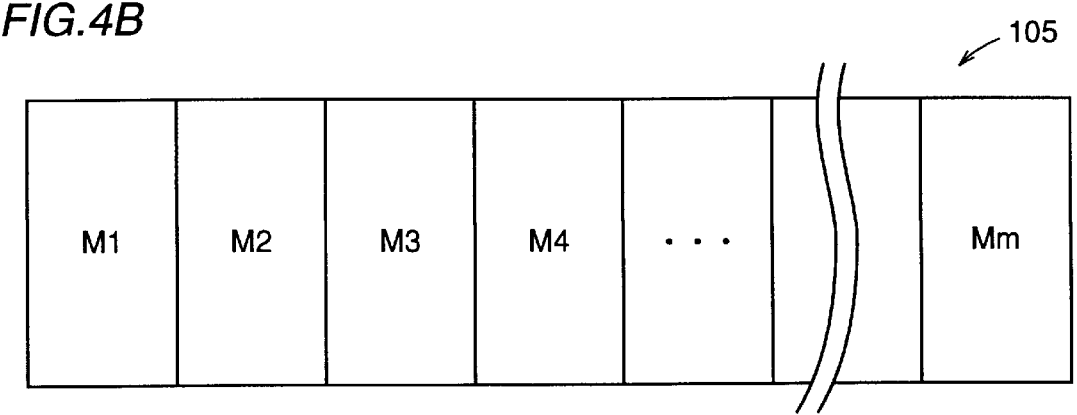
FIG.4B

P1 P2 P3 P4 P5 P6  P10 P11 P12 P13 P14 P15

METHOD AND APPARATUS FOR CREATING ANIMATION HAVING MOTION CHANGING WITH PASSAGE OF TIME AS DESIRED AND COMPUTER-READABLE RECORDING MEDIUM IN WHICH ANIMATION CREATING PROGRAM IS RECORDED

BACKGROUND OF THE INVENTION

1. Field of the Invention

The present invention relates to methods and apparatuses for creating an animation having a presenting time specific to each frame by a computer and computer-readable recording media in which an animation creating program is recorded. More particularly, the present invention relates to a method and apparatus for creating an animation and a computer-readable recording medium in which an animation creating program, capable of readily determining the above mentioned presenting time.

2. Description of the Background Art

Moving image data such as those forming an animation consists of an extremely large number of images called frames. Some methods have been proposed and come in practice as methods of creating an animation having a motion whose timing is arbitrarily adjusted.

As a first example, a method of creating an animation in synchronization with a sound using a Director (product name), which is an authoring software produced by Macromedia Corporation, will be described.

FIGS. 17, 18A and 18B respectively show a table called a score and casts for controlling an animation used in the Director. Columns of the score shown in FIG. 17 include channels such as a sound channel 1001, animation channel 1002, and tempo channel 1009, whereas rows include a plurality of frames 1003 of an animation changing with passage of time. Thus, a single row is regarded as a single frame 1003. In the Director, a cell 1004 is positioned at the intersection of each channel (each column) and each frame 1003 (each row) in the score. The animation is created by making sound data 1001, image data 1102 or the like in FIGS. 18A and 18B, which is called as a cast, correspond to cell 1004.

Referring to FIGS. 18A and 18B, each cast is denoted by a cast number 1103. As shown in FIG. 17, cell 1004 in the score which corresponds to each cast is generally denoted by a cast number 1005. Although cast number 1005 is exemplified as ⑪ here, actually, the number is not denoted with a circle. The casts in FIGS. 18A and 18B which are related to the score in FIG. 17 are referred to as sprites.

As a plurality of sprites corresponding to the same cast number 1005 are arranged in a column in sound channel 1001 of the Director, the plurality of sprites are processed as single sound data. For example, for the sprites of cast number 1005 (cast number ⑪) corresponding to each sound channel 1001 of four frames 1003 as shown in FIG. 17, regeneration of the sound data is started at a time corresponding to the first frame 1003 at the left end in the score, and finished at a time corresponding to the last frame 1003 at the right end in the score.

In the score, the sprites corresponding to the same frame 1003 are regenerated at the same time. In the score shown in FIG. 17, for example, all the sprites corresponding to the same frame 1003, that is, the sprite corresponding to cast number ⑪ (sound data 1101) and that corresponding to cast number ㉑ (image data 1102), are regenerated at the same time.

FIG. 19 shows an exemplary layout of a tempo setting screen used in the Director. On the tempo setting screen, generally, the number of frames 1003 corresponding to one second is determined by operating a slider 1303. When a selection button 1304 (1305) is selected, the operation of slider 1303 is neglected. When regeneration of sound data 1101 corresponding to any of at least one sound channel 1001 is finished, a displaying process for next frame 1003 is started.

The time during which each frame 1003 in the score is presented to the animation is controlled by a tempo channel 1009. The tempo setting screen layout shown in FIG. 19 corresponds to cell 1004 for tempo channel 1009. Numbers 1031 to 1034 of the corresponding tempo setting screen layouts are displayed on the cells. p Next, a second example will be described. Among a variety of video editing methods using a computer, there is a method of editing a video after sounds are visually edited as a waveform to facilitate an operation of synchronization adjustment. An exemplary user interface for such editing method is shown in FIG. 20. In the editing method, an image track 1402 for the video is brought into synchronization with a sound track 1401 in which the sound is displayed as the waveform. More specifically, at image track 1402, each image is moved to a position corresponding to that portion of the waveform in sound track 1401 which indicates the corresponding sound by an inputting device such as a mouse.

A third example will be described as the art disclosed in Japanese Patent Laying-Open No. 4-324777. In the aforementioned laid-open application, a difference between regeneration times for video and sound data is detected. Based on the detected difference, a reading time interval for regenerating one data is adjusted to that for the other data, so that video and sound data are regenerated in synchronization to each other.

Referring to FIG. 21, a procedure for bringing the animation created by image data 1102 into synchronization with sound data 1101 using the Director in the above described first example will be described. It is noted that sound data 1101 consists of sounds "ichi, ni, san, shi."

First, an initial value "2" is set for a variable i indicating an order of frames (S1201). Then, sound and image data 1101 and 1102 are regenerated (screen display and sound output) (S1202), a determination is made as to whether image data 1102 (cast number ㉒) of the second (i=2) frame is in synchronization with sound data 1101 corresponding to the sound "ni" (S1203). If a timing for regenerating image data 1102 is faster, the tempo setting screen layout shown in FIG. 19 corresponding to tempo channel 1009 of the first (i=1) frame is displayed, and slider 1303 is operated, such that the timing for regenerating image data 1102 is set slightly later (S1205). Next, sound and image data 1101 and 1102 are again regenerated (S1202). If the timing for regenerating sound data 1101 is faster, the tempo setting screen layout shown in FIG. 19 corresponding to tempo channel 1009 of the first (i=1) frame is displayed, and slider 1303 is operated such that the timing for regenerating image data 1102 is set slightly faster (S1204).

When synchronization of image data 1102 and sound data 1101 for the second (i=2) frame is achieved by such repetition of adjusting processes (S1202 to 1205), the process proceeds to the adjustment for the next (i=3) frame (S1207).

The above described adjusting processes are similarly repeated for image data 1102 corresponding to each of sound data 1101 (i=3) corresponding to "san" and sound data 1101 (i=4) corresponding to "shi."

When an animation including only image is to be created without any sound, in order to achieve a precise animation having a motion changing with passage of time as desired by the producer, a procedure similar to that according to the flow chart shown in FIG. 21 is required. Thus, a laborious and complicated operation is required for creating the animation. Naturally, when an animation consists of a large number of frames is to be created, the level of such laborious operation further increases.

When synchronization of an animation of image data and sound data is to be achieved in the video editing system utilizing a waveform of the sound data which has been described as the second example, it is not easy to determine to which portion of the sound data the image data for each frame correspond while referring to the waveform of sound data over a long period of time. Therefore, a process shown in FIG. 21 is required for regenerating the sound data and image data of the animation to detect portions which are not in synchronization with each other and, based on the detection result, successively correcting the portions starting from a regeneration starting point. Thus, a complicated and laborious operation is required also for the second example.

In the Japanese Patent Laying-Open No. 4-324777 which has been described as the third example, synchronization of image and sound data is to be achieved when the corresponding portions (fragments) are preliminary given. In the aforementioned laid-open application, a method of extracting the corresponding portions from the image and sound data is not disclosed. For example, the aforementioned laid-open application No. 4-324777 can be applied only when it is assumed that the image and sound data for which one shot (a unit of filming) corresponds to a small number of words have preliminary been extracted. However, when synchronization of image and sound data over a long period of time is to be achieved, synchronization of starting and ending points of the overall data is readily be achieved. However, to bring the image and sound data, especially in the middle portion, completely in synchronization with each other, a complicated and laborious operation is required. In other words, all of the corresponding portions of the image and sound data must be separately extracted as a plurality of pieces of data by some system. Then, for each of the prepared plurality of pieces of data, a process of synchronization adjustment according to the aforementioned laid-open application No. 4-324777 must disadvantageously be performed.

SUMMARY OF THE INVENTION

An object of the present invention is to provide a method and apparatus for creating an animation having a motion changing with passage of time as desired by a producer while requiring less operation time, and to provide a computer-readable recording medium in which an animation creating program for executing an animation creating method with a computer is recorded.

To achieve the aforementioned object, the method of creating the animation according to the present invention includes: an indication signal inputting step; a time determining step; and a recording step, where the steps are:performed in passage of time at an arbitrary speed. In the indication signal inputting step, a timing indication signal indicating a timing corresponding to a boundary between adjacent frames is input for each of a plurality of frames for the animation. In the time determining step, a time during which each of the plurality of frames is presented to the animation is determined in accordance with the input timing indication signal. In the recording step, information indicating the determined time is recorded on the medium for each of the plurality of frames.

Therefore, the producer can intuitively input a signal indicating a timing at desired intervals in real time. Unlike the conventional method of sequentially adjusting and determining the presenting time for each frame starting from the first frame for the animation, the present invention enables the presenting time to be determined and recorded in a short period of time.

In the method of creating the animation, the aforementioned indication signal inputting step may include an information regenerating step and a first signal inputting step. In the information regenerating step, preliminary recorded guide track information (information to be referenced for identifying the boundary between the frames) is regenerated at a regeneration rate in accordance with the aforementioned arbitrary speed for output. In the first signal inputting step, the timing indication signal is output in accordance with information output by the information regenerating step for each of the plurality of flames.

The timing indication signal can be input in accordance with the regenerated and output guide track information. Thus, the presenting time for each frame is determined and recorded in a much shorter period of time as compared with the conventional case.

As the timing indication signal is input in accordance with the regenerated and output guide track information, creation of an animation in synchronization with the guide track information is facilitated.

In the method of creating the animation, the plurality of frames may be key frames. In this case, a presenting time for each key frame can be determined and recorded in a shorter period of time as compared with the conventional case.

In the method of creating the animation, the guide track information relates to sounds. Thus, information related to sounds such as waveform of sound signal information or note information is regenerated at the regeneration rate in accordance with the arbitrary speed in passage of time at the arbitrary speed. Thus, the presenting time for each frame can be easily determined while listening to the output sounds. In addition, creation of the animation in synchronization with sounds is facilitated.

In the method of creating the animation, the guide track information relates to a dynamic image. The information regenerating step includes an image synthesizing and displaying step for synthesizing each of the plurality of frames with the dynamic image information while regenerating the dynamic image information at the regeneration rate in accordance with the arbitrary speed for display. Thus, the producer can readily determine the presenting time for each frame while looking at the synthesized image. In addition, an animation in which the frame is synthesized with the dynamic image in synchronization is readily created.

In the method of creating the animation, the guide track information indicates passage of time at an arbitrary speed. In the information regenerating step, a metronome signal is generated and output in accordance with a prescribed tempo based on the time information indicated by the guide track information. Thus, even when an animation which is not related to the timing information as to sounds or the like, a motion at an objective rate in accordance with the metronome signal can readily be added to the animation.

In the method of creating the animation, the information regenerating step includes first and second steps. In the first step, preliminary recorded guide track information is regenerated at a regeneration rate in accordance with the above mentioned arbitrary speed. In the second step, the regenerated guide track information is input, and output as the timing indication signal through a filter having a prescribed extracting condition. Thus, when the guide track information is waveform information of a sound signal, the timing indication signal corresponding to the boundary for the frames can correctly be input as compared with the case where the timing indication signal is input by the producer.

When the guide track information is related to a dynamic image, the boundary of shots (units of filming) is detected by the filter having the prescribed extracting condition. Thus, the timing indication signal can automatically and correctly be generated.

To achieve the aforementioned object, a method of creating an animation according to another aspect of the present invention includes a portion determining step, a presenting time determining step and a recording step. In the portion determining step, for each of the plurality of frames forming the animation, corresponding partial information of the guide track information is determined by using the guide track information which has been output from the filter having an arbitrary extracting condition. In the presenting time determining step, a time during which each of the plurality of frames is presented to the animation is determined in accordance with the determined partial information. In the recording step, for each of the plurality of frames, the presenting time determined by the presenting time determining step is recorded onto a medium.

In the above described of creating the animation, the presenting time for each of the plurality of frames is not determined in passage of time at an arbitrary speed. Namely, a portion of the guide track information (partial information) corresponding to each of the plurality of frames is obtained and the presenting time for each frame is determined in accordance with the determined partial information by the portion determining step and presenting time determining step. Therefore, when a real time process for creating the animation is difficult because of a load from the process of extracting the timing indication signal in accordance with the guide track information, the method of creating the animation is particularly effective.

To achieve the aforementioned object, an apparatus for creating an animation according to the present invention includes: an indication signal inputting portion, a time determining portion and a recording portion for performing the step in passage of time at an arbitrary speed. In the indication signal inputting portion, a timing indication signal indicating a timing corresponding to a boundary between adjacent frames is input for each of the plurality of frames for the animation. In the time determining portion, a time during which each of the plurality of frames is presented to the animation is determined in accordance with the input timing indication signal. In the recording portion, information indicating the determined time is recorded onto a medium for each of the plurality of frames.

Thus, a producer can intuitively input a signal indicating a timing at desired intervals in real time. Unlike the conventional method of sequentially adjusting and determining the presenting time for each frame starting from the first frame for the animation, the presenting time can be determined and recorded in a short period of time.

To achieve the aforementioned object, a computer-readable recording medium according to the present invention has an animation creating program recorded therein for executing with a computer an animation creating method.

The animation creating method includes an indication signal inputting step, a time determining step and a recording step, where the steps are performed in passage of time at an arbitrary speed. In the indication signal inputting step, a timing indication signal indicating a time corresponding to a boundary between adjacent frames is input for each of the plurality of frames for the animation. In the time determining step, a time during which each of the plurality of frames is presented to the animation is determined in accordance with the input timing indication signal. In the recording step, information indicating the determined time is recorded on the medium for each of the plurality of frames.

Thus, a producer can intuitively input the signal indicating the timing at desired intervals in real time. Therefore, unlike the conventional method of sequentially adjusting and determining the presenting time for each frame starting from the first frame for the animation, the presenting time can be determined and recorded in a short period of time.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustration schematically showing an apparatus for performing the method of creating the animation described in each of the embodiments according to the present invention.

FIGS. 4A and 4B are diagrams shown in conjunction with a relation between frame information and guide track information for the animation.

DESCRIPTION OF THE PREFERRED EMBODIMENTS

Embodiments of the present invention will now be described with reference to the drawings.

First Embodiment

Figure 1:
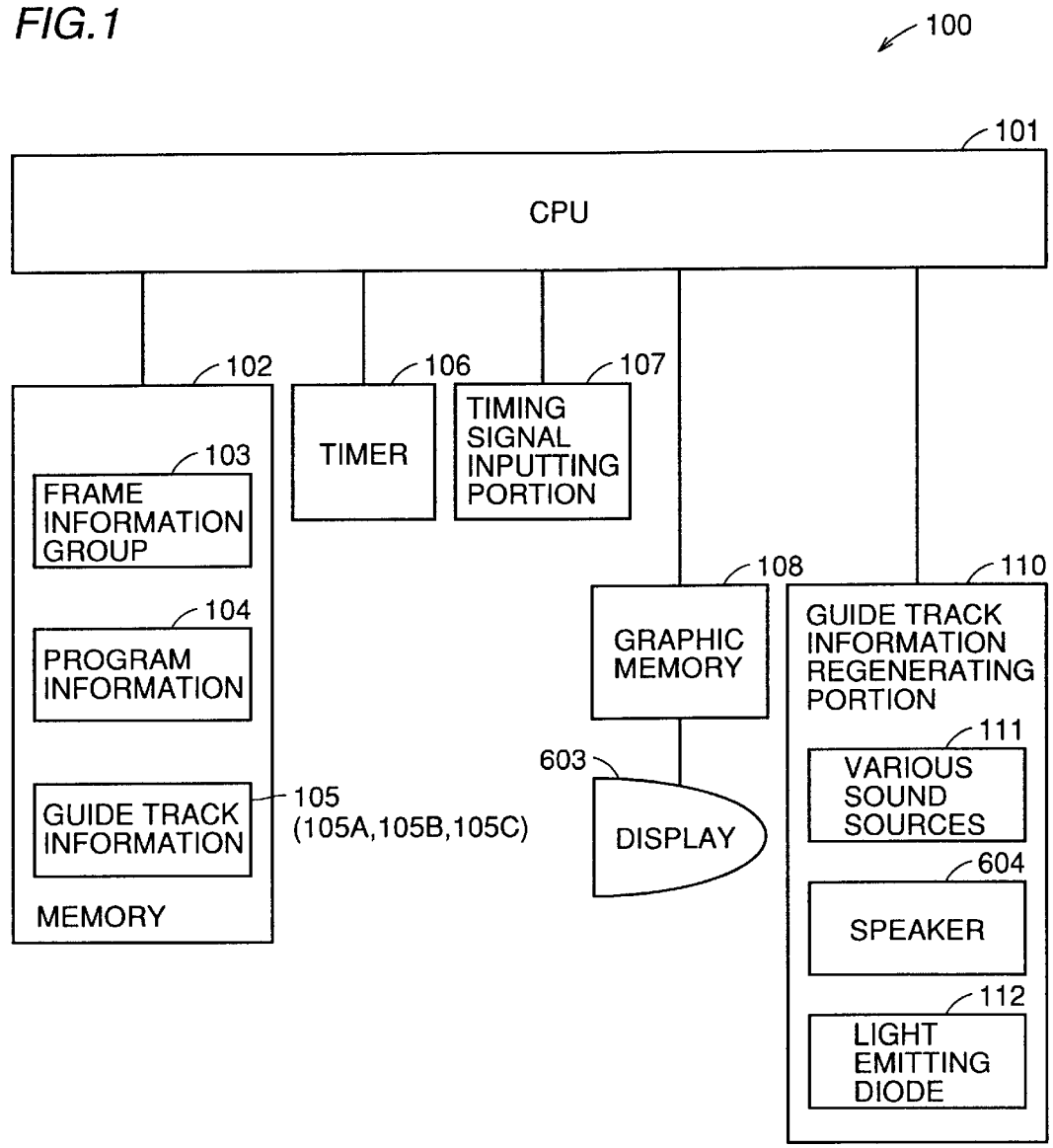
FIG. 1 is a diagram showing a structure of a computer for performing a method of creating an animation applied to each of the embodiments according to the present invention.

A first embodiment will now be described. FIG. 1 shows a structure of a computer 100 for performing a method of creating an animation applied to each of the embodiments of the present invention. Computer 100 includes: a CPU (abbreviation for Central Processing Unit) 101 for executing a prescribed program in accordance with each of flow charts which will later be described; a memory 102 connected to CPU 101; a timer 106 to be: referenced by CPU 101 for acquiring information related to time; and a timing signal inputting portion 107 for inputting a signal indicating various timings related to creation of the animation. These components are all forming a basic structure. Further, computer 100 may include as an extended portion; a graphic memory 108 to which image data of the animation is written by CPU 101; a display 603 for displaying the image data written to graphic memory 108; and a guide track information regenerating portion 110 for regenerating guide track information 105 (105A, 105B and 105C) which will later be described. Guide track information regenerating portion 110 includes various sound sources 111, a speaker 604, a light emitting diode 112 and the like.

Memory 102 stores: a frame information group 103 which is the information related to a plurality of frames forming the animation; program information 104 related to the method of creating the animation which is read and executed by CPU 101; and guide track information 105 (105A, 105B and 105C) as the extended portion of the memory.

Figure 2:
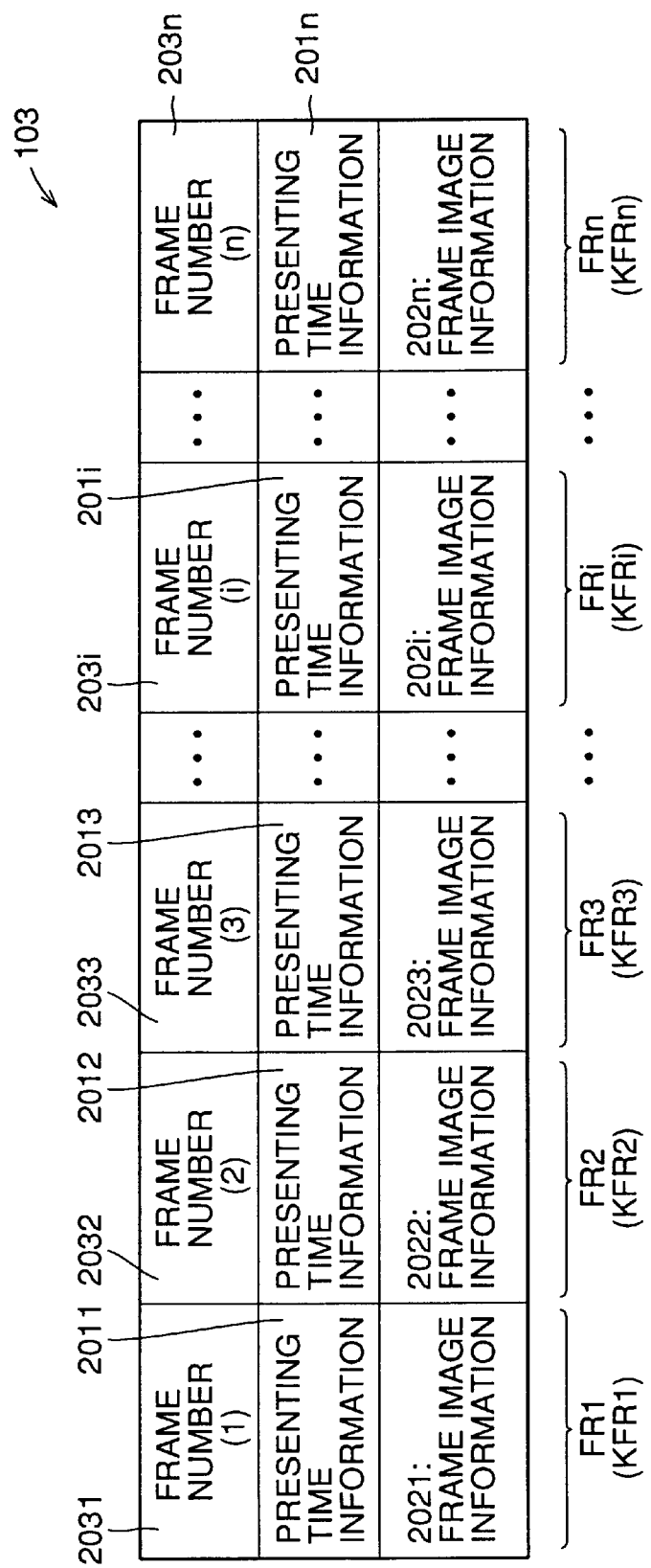
FIG. 2 is a diagram showing a structure of frame information shown in FIG. 1.

FIG. 2 shows a structure of frame information group 103. Referring to FIG. 2, frame information group 103 includes a plurality of pieces of frame information FRi (i=1, 2, 3, ..., n) for a plurality of (for example n) frames forming the animation. Each of the pieces of frame information FRi includes a frame number 203i for uniquely identifying frame information FRi or the corresponding frame, presenting time information 201i and frame image information 202i. Presenting time information 201i indicates a time during which the corresponding frame is displayed at the time of animation display (regeneration). Frame image information 202i indicates the image of the corresponding frame.

The present embodiment relates to the animation which is regenerated by display of each frame for its specific presenting time. On the other hand, in a general method of regenerating an animation, the presenting time of each frame is in most cases fixed. For example, in the case of an animation having twelve frames per second, the presenting time for one frame is fixed to $1/12$ seconds. In addition, the same frame image is often used for a frame group including a successive plurality of frames for the convenience of the animation or for the purpose of reducing a production cost. In the present embodiment, such frame group is processed as one frame when producing the animation and, the frame group is divided corresponding to the number of frames per second for each medium when the data of the produced animation is recorded onto a recording medium such as a film or video tape.

In Japanese Patent Laying-Open No. 60-191366, an animation in accordance with a key frame interpolation method is disclosed. The key frame refers to a frame which selves as a key in time series. In the aforementioned laid-open application, a method of regenerating the animation in accordance with the key frame interpolation method is disclosed. In the regenerating method, a plurality of frames (hereinafter referred to as intermediate frames) between the key frames are produced by interpolation. Thus, animation data which is smoothly regenerated from a small amount of image data is generated. Further, the present embodiment relates to an animation in accordance with the key frame interpolation method. Frame information FRi shown in FIG. 2 may also be key frame information KFRi. When the animation is created in the present embodiment in accordance with the key frame interpolation method, presenting time information 201i corresponding to key frame information KFRi in FIG. 2 indicates a time for regenerating at least one intermediate frame between the current key frame and the next frame while producing them by interpolation. It is noted that the production of the intermediate frames by the interpolation may be performed at the time of regeneration of the animation in real time or in a stage of producing the animation.

FIG. 3 shows a schematic structure of an apparatus for performing the method of creating the animation described in each embodiment. The apparatus shown in FIG. 3 includes a case 601, a keyboard 602, display 603 and speaker 604. Computer 100 shown in FIG. 1 is also mounted to the apparatus. Case 601 includes CPU 101, memory 102, timer 106, graphic memory 108 or the like which are shown in FIG. 1. Keyboard 602 corresponds to timing signal inputting portion 107 shown in FIG. 1. Speaker 604 is included in guide track information regenerating portion 110 in FIG. 1. When sound information is used as guide track information 105, guide track information regenerating portion 110 arranged on a path between CPU 101 and speaker 604 includes a digital analog converter, a sound signal amplifier or the like (not shown). These are generally included in case 601.

FIG. 4A schematically shows frame information for an animation (later described) stored as frame information group 103 in FIG. 1. Similarly, FIG. 4B schematically shows guide track information (sound information) stored in memory 102. More specifically, waveforms of sounds "ichi, ni, san, shi" are sampled and stored as numerical data. It is noted that the guide track information is used as a reference for identifying boundary between adjacent times for each of the plurality of frames to be presented to the animation. In the present embodiment, the producer successively inputs a signal indicating a timing corresponding a boundary between the frames using keyboard 602 by a real time process while listening to the sounds "ichi, ni, san, shi," which sounds are guide track information 105 shown in FIG. 4B and output from speaker 604. Thus, presenting time information 201$i$ for the frame image corresponding to each of the sounds "ichi," "ni," "san," and "shi" is determined. A process in accordance with a program for producing such animation will now be described.

Figure 5:
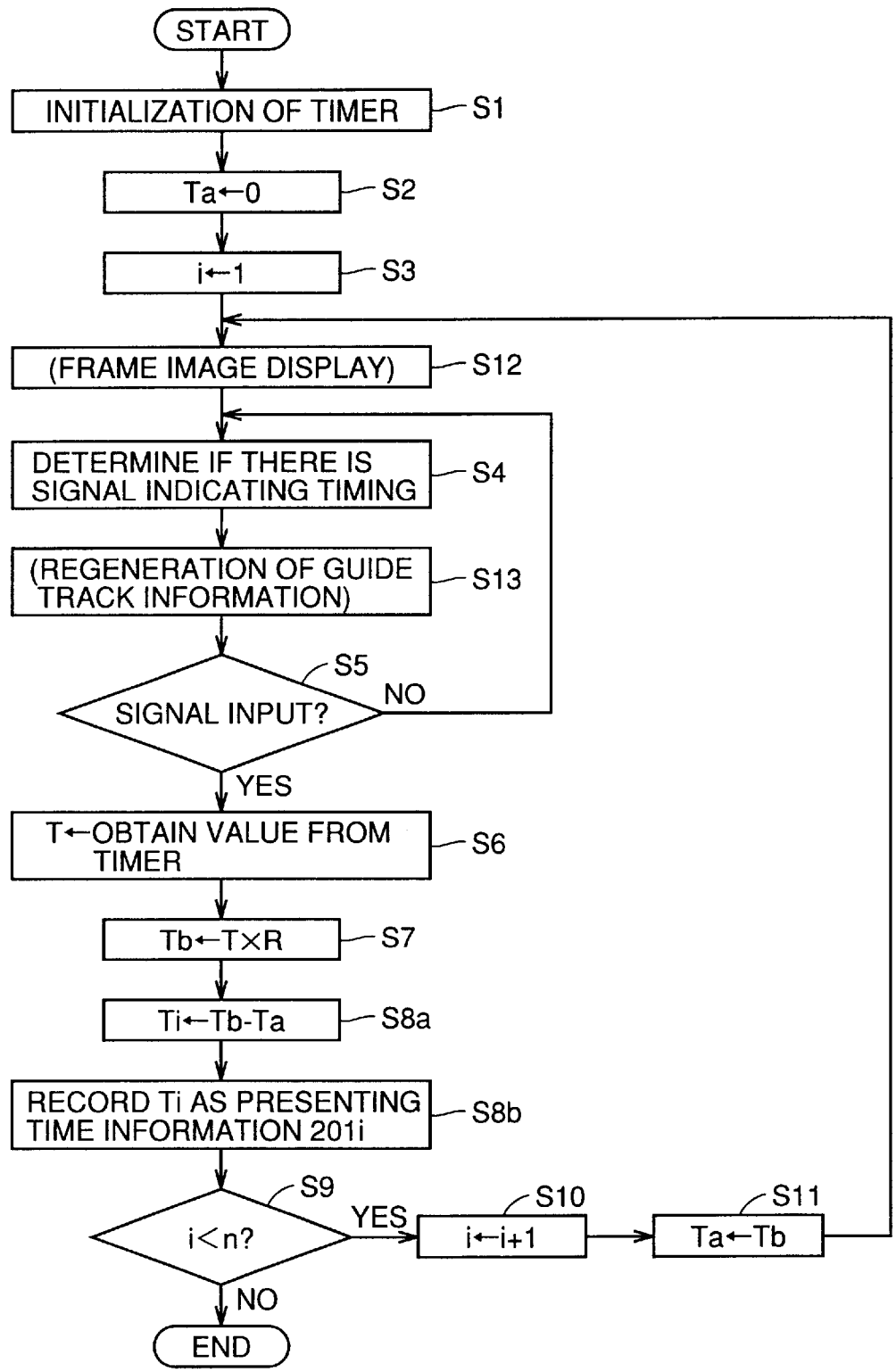
FIG. 5 is a flow chart showing a process of creating the animation according to a first embodiment of the present invention.
Figure 6:
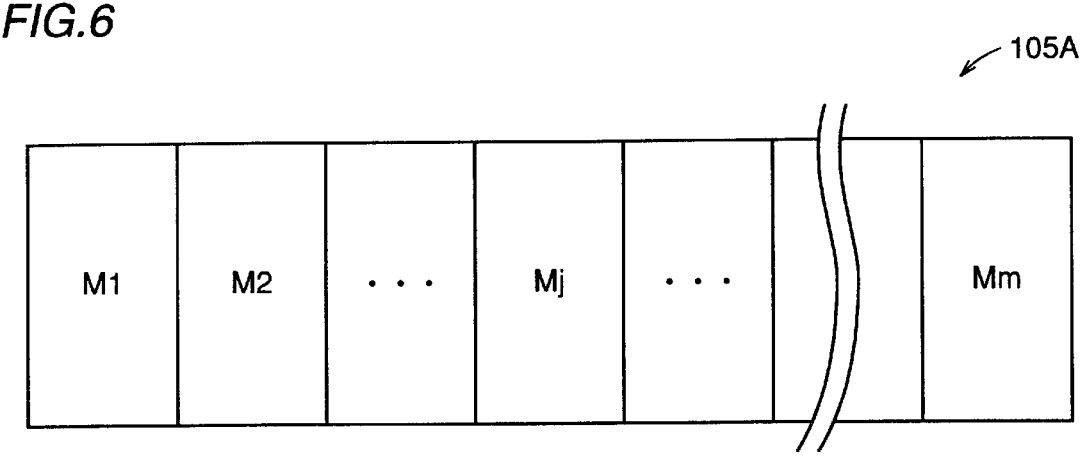
FIG. 6 is a diagram exemplifying guide track information 105A shown in FIG. 1.

FIG. 5 is a flow chart showing a process of creating an animation according to a first embodiment. FIG. 6 is a diagram exemplifying guide track information 105A shown in FIG. 1. Waveforms of sounds are sampled particularly in connection with amplitudes, and the resulting numerical values are preliminary stored as amplitude information Mj (j=1, 2, 3 . . . m) in guide track information 105A.

First, timer 106 is initialized (S1). A value of timer 106 is set to 0 by the initialization. It is noted that the initialization of timer 106 is not limited to this method. Namely, timer 106 may continuously operate, and the value of timer 106 is stored in a prescribed region of memory 102 at the initialization for subsequent use as a reference value.

Thereafter, the initial value of timer 106, that is, 0, is applied to a variable Ta representing a scheduled presenting starting time for the current frame (S2). The term "time" used herein refers to the time assuming a regeneration starting point for the animation as 0. The time is specifically referred to as the "scheduled time" because passage of time for production and regeneration of the animation may be different due to a coefficient R (later described). In other words, the term "scheduled time" refers to the time when the animation is regenerated. The current frame is presented over a time between scheduled presenting starting time Ta and scheduled presenting ending time Tb. Each of the plurality of frames is presented over a period indicated by corresponding presenting time information 201$i$. Thus, the animation is regenerated.

Further, 1 is applied to a variable i representing frame number 203$i$ corresponding to the current frame (S3). The processes for S12 and S13 will later be described.

Next, the process waits for the input of the signal indicating a timing for a boundary between frames of the animation loop process in S4 and S5). In other words, CPU 101 determines if the signal has been input from timing signal inputting portion 107 (S4). If the signal has been input, a value of timer 106 (in this case, a value indicating an elapsed time after the start of the process (S1)) is read and applied to a variable T.

It is noted that the process in S4 is not limited to the above mentioned method in which the processing program actively monitors if the timing indication signal has been input. For example, a process called a hardware interruption may be started at the time of the input of the timing indication signal, so that the processing program is notified of the input of the timing indication signal.

Specific example of timing signal inputting portion 107 include an input device such as a keyboard or mouse. In this case, the producer can input the signal at an arbitrary timing.

Next, a value of variable Tb representing the scheduled presenting ending time for the current (i=1) frame is calculated (S7). The value of variable Tb is obtained by multiplying a value of variable T by a value of a coefficient R determining a speed of passage of time. Normally, variable Tb matches variable T representing the elapsed time after the start of the process (S1). In other words, a normal case is where coefficient R=1.

Thereafter, a value of a time between the scheduled presenting starting and ending times for the current frame, that is, the value of (Tb−Ta), is applied to variable Ti representing presenting time information 201$i$ corresponding to the current (i=1) frame (S8$a$, S8$b$). Thus, the process for one frame is finished.

Subsequently, it is determined if the current (i=1) frame is the nth frame, that is, the last frame (S9). If it is the last frame, the process is finished. If not, 1 is added to variable i (S10) and the process proceeds to the process for the next frame. After the value of variable Ta representing the scheduled presenting starting time for the current frame is updated with variable Tb representing the scheduled presenting starting time for the previous frame, the process returns to S4 and a similar process is repeated.

By the above described real time process, presenting time information 201$i$ specific to each frame is successively determined and set to frame information group 103.

The above described process is performed assuming the value of coefficient R as 1. However, when the timing indication signal must be input with higher accuracy or more frequently, or when a producer who is not with sufficient reflexes or sense of rhythm performs the inputting operation, desirably, coefficient R is preliminary set at a value lower than 1. For example, if coefficient R is set at 0.5, the timing indication signal can be input in a so-called slow motion mode at a rate which is half the assumed animation regeneration rate. Therefore, presenting time information 201$i$ for the animation can be correctly determined with sufficient margin.

On the other hand, when the producer has a sufficient ability to catch up with the input operation of the timing indication signal, coefficient R may preliminary be set at a value greater than 1. For example, if coefficient R is 2, the input operation of the timing indication signal is performed in a so called fast-forward at a rate twice the assumed animation regeneration rate. As compared with the case where coefficient R is 1, determination and setting of presenting time information 201$i$ can be completed in a time which is half the total regeneration time for the animation.

Image display processing for each frame in FIG. 5 (S12) will now be described. Frame image information 202$i$ for each frame forming the animation may preliminary be set in frame information group 103, or set after presenting time information 201$i$ specific to each frame is determined and recorded in frame information group 103. A procedure for setting presenting time information 201$i$ when frame image information 202$i$ is preliminary set in frame information group 103 will now be described.

After a process of displaying ith frame image information 202$i$ which has been preliminary set in frame information group 103 on display 603 (S12) is executed with reference to FIG. 5, the image for the current frame can readily be perceived by the producer. The signal indicating a timing for a boundary between frames can be input while verifying a motion of the image for the frame in the real time process by display. The image for the current frame displayed on display 603 is maintained by graphic memory 108 or the like until the image for the next frame is displayed.

It is noted that in the production of the animation according to the above described key frame interpolation method, a similar effect is obtained if the image for the key frame rather than the frame is displayed.

Now, the process in FIG. 5 will be described as using guide track information 105 for determining presenting time information 201$i$ for each frame. In a process of directly regenerating guide track information 105 by CPU 101 (S13), a part of the guide track information 105 preliminary stored in memory 102, which corresponds to the value of timer 106 at that point, is regenerated. By repeating the process in FIG. 5, the corresponding portion of the guide track information is successively regenerated, so that the producer of the animation can perceive it as continuous information. The producer inputs the timing indication signal from timing signal inputting portion 107 in accordance with regenerated guide track information 105. Thus, presenting time information 201i corresponding to guide track information 105 is recorded in frame information group 103.

It is noted that in the present embodiment, to directly regenerate guide track information 105 by a single CPU 101, a regenerating process (S13) for guide track information 105 is included in the repeating process in FIG. 5 which is performed by CPU 101. However, the present embodiment is not limited to this method. More specifically, a trigger signal is generated by CPU 101 at the start of the process in FIG. 5, so that a dedicated regenerating apparatus (not shown) for guide track information 105, which is not directly controlled by CPU 101, may be started by the trigger signal. Such regenerating apparatuses for guide track information 105 include a recording tape, video tape or the like. When coefficient R is variable, such regenerating apparatus may require a mechanism for changing a regeneration rate in accordance with coefficient R.

Second Embodiment

A second embodiment will now be described. In the present embodiment, presenting time information 201i is determined by using guide track information 105A. Guide track information 105A is obtained by setting amplitude information Mj (j=1, 2, 3, ... n) of a digital value which is obtained by sampling amplitude information of a waveform of a sound signal as shown in FIG. 6 at prescribed intervals. To simplify the description, assume here that an increment of timer 106 is 1/10000 seconds, and sampling interval for amplitude information of the sound signal is similarly 1/10000 seconds. Accordingly, every time timer 106 is incremented by one, single piece of amplitude information Mj is read from guide track information 105A by guide track information regenerating portion 110 and subjected to a digital-to-analog conversion (hereinafter simply referred to as D/A conversion) process. Thus, sounds are output from speaker 604 at the original regeneration rate and the original frequency.

Figure 7:
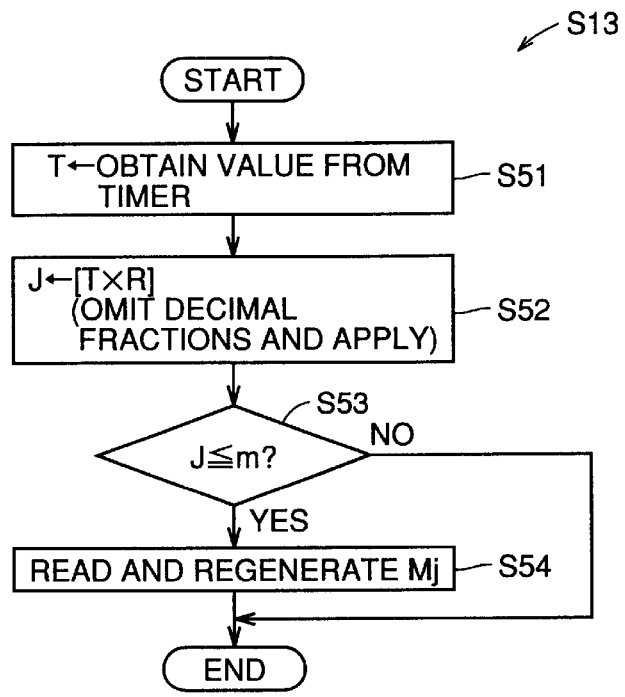
FIG. 7 is a flow chart showing a process of regenerating guide track information 105A in a second embodiment of the present invention.

Referring to FIG. 7, a process of regenerating guide track information 105A will be described. The process corresponds to the process (S13) of regenerating the guide track information in FIG. 5. First, a value which has been read from timer 106 is applied to a variable T (S51). Assume that the value read from timer 106 is also in a unit of 1/10000 seconds. The value of variable T is multiplied by coefficient R determining the regeneration rate, and the decimal fractions of the resulting value are omitted. The resulting value is then stored in a pointer variable J indicating each element of guide track information 105A.

Thereafter, it is determined if pointer variable J is within a range of the value in guide track information 105A (that is, if J≦m) (S53). If the value is in the range, amplitude information Mj indicated by point variable J is read from guide track information 105A and regenerated as sounds (S54). The regeneration in this case corresponds to a process in which amplitude information Mj is subjected to the D/A conversion and amplified by an amplifying circuit for driving speaker 604, so that sounds are output.

It is noted that the above described process is on the premise that CPU 101 is provided with a sufficient ability to read amplitude information Mj from guide track information 105A at prescribed intervals. However, if not, a mechanism which is independent of CPU 101 may read amplitude information Mj from guide track information 105A and transfer it to the D/A converter in parallel to the operation of CPU 101. Such process is known and performed by those skilled in the art.

As described in the first embodiment, also in the second embodiment, coefficient R is set at 0.5, for example when the timing indication signal is input at a rate half the assumed regeneration rate for the animation. In the process shown in FIG. 7, if it is assumed that the value of pointer variable J is incremented by one, as 1, 2, 3, 4, 5, ..., when coefficient R is one (actually, the increment of the value of pointer variable J differs from the ability of CPU 101), if coefficient R is 0.5, the value of pointer variable J increases while repeating the same number, as 1, 1, 2, 2, 3, 3, 4, 4, 5, 5, ... Thus, a reading speed of the information from guide track information 105A is half that where coefficient R is one, and the time required before the value of pointer variable J reaches m doubles. In other words, the sounds to be referenced by the passage of time are slowly regenerated at the rate which is half the original rate, so that the producer can perform the inputting operation of the timing indication signal more accurately. As a result, the animation which is in accurate synchronization with the sounds can be created.

Conversely, when the rate of regenerating the frame image for the animation is relatively slow with respect to the sounds and when the producer has a sufficient ability of inputting the timing indication signal, coefficient R is set for example of two. Thus, as the value of pointer variable J increases as 1, 3, 5, 7, 9, ..., while skipping every other number, the sounds are regenerated at a rate twice that in the case where coefficient R is one.

It is noted that a frequency (a pitch) of the regenerated sound may change with the change in the speed for reading the piece of information from guide track information 105A, so that sometimes it becomes difficult to hear the regenerated sound. To solve this problem, the methods called time stretch and pitch shift are combined and applied in reading amplitude information Mj from guide track information 105A. Thus, guide track information 105A is corrected to a sound signal having a frequency which is the same as or close to that of the original sound. These methods are well known in the art and not described in detail here.

Another method of generating sounds includes a method using note information. The note information represents degree, length, intensity, tempo or the like of the sounds in terms of numerical values or symbols, and representably includes an MIDI (Musical Instruments Digital Interface). The note information may also be used as the guide track information.

Figures 8A, 8B:
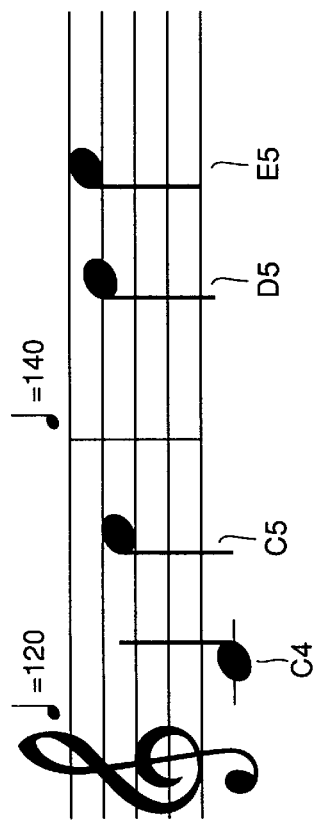
FIG. 8A is a diagram partially showing musical notations including a plurality of notes.
FIG. 8B is a diagram showing an internal structure of guide track information 105B (standard MIDI file) corresponding to the musical notations shown in FIG. 8A.

FIG. 8A partially shows music notations including a plurality of notes. FIG. 8B shows an exemplary internal structure of a standard MIDI file corresponding to FIG. 8A. The musical notations shown in FIG. 8A includes two bars.; Two quarter notes, C4 and C5 are regenerated at tempo 120 successively after a treble clef in the first bar. Here, tempo 120 means that 120 quarter notes are regenerated in one minute. Thereafter, in the second bar, the tempo is changed to tempo 140, and two quarter notes, D5 and E5, are regenerated at the tempo 140.

In FIG. 8B, the MIDI file (hereinafter referred to as guide track information 105B) corresponding to the musical notes shown in FIG. 8A includes at its head header information 200 including a time signature such as a track name, and includes an end symbol 207 at its end. Guide track information 105B includes information related to tempo setting and notes. More specifically, as the information for the first bar shown in FIG. 8A, tempo setting information 201 (tempo 120) and note information 202 and 203 indicating quarter notes of letter notations C4 and C5 are included. Similarly,: as information for the second bar, tempo setting information 204 (tempo 140) and note information 205 and 206 indicating quarter notes of letter notations D5 and E5 are included.

To change the regeneration rate of the sounds based on the content of guide track information 105B in FIG. 8B, numerical values (120 or 140) indicated by tempo setting information 201 or 204 may be multiplied by a constant coefficient R.

Figure 9A:
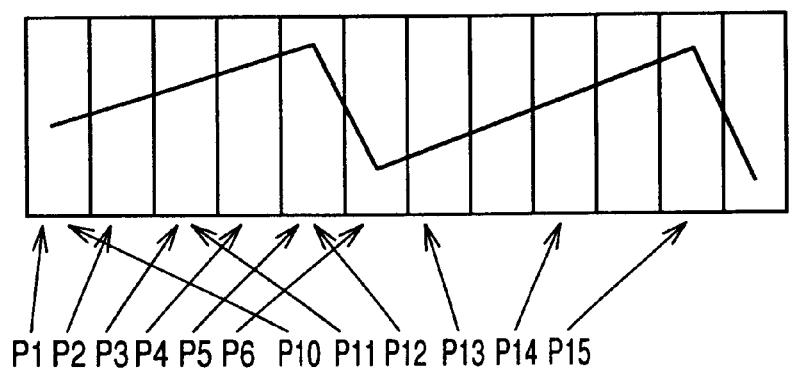
FIGS. 9A, 9B and 9C are diagrams exemplifying waveform tables related to guide track information 105B in FIG. 8B.
Figure 9B:
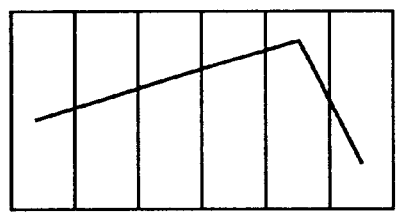
Figure 9C:
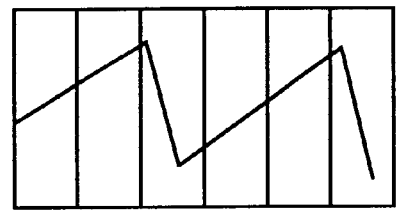

It is noted that as a method of outputting note information of guide track information 105B as sounds, a method of making a module such as a music synthesizer in sound sources 111 connected to CPU 101 output sounds may be used. However, the present embodiment is not limited to this method. A waveform table 301 as shown in FIG. 9A showing information related to a signal waveform of the sounds is preliminary recorded in memory 102. When note information 202 of C4 is read from guide track information 105B, information is read from waveform table 301 at prescribed reading pitches (P1 to P6), so that information related to the waveform shown in FIG. 9B is obtained. Similarly, when note information 203 of C5 is read, information is read from waveform table 301 at pitches (P10 to P15) twice those in the case of C4, so that information related to the waveform indicating a sound which is higher than C4 by one octave is obtained. As described above, the information related to the waveform shown in FIGS. 9B and 9C are subjected to D/A conversion, amplified and output from speaker 604 as sounds.

Third Embodiment

Figure 10:
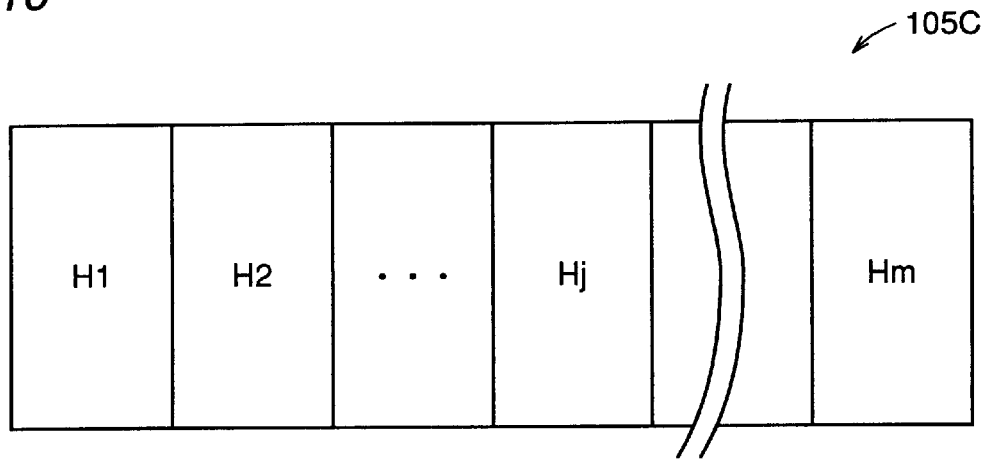
FIG. 10 is a diagram showing guide track information 105C according to a third embodiment of the present invention.
Figure 11:
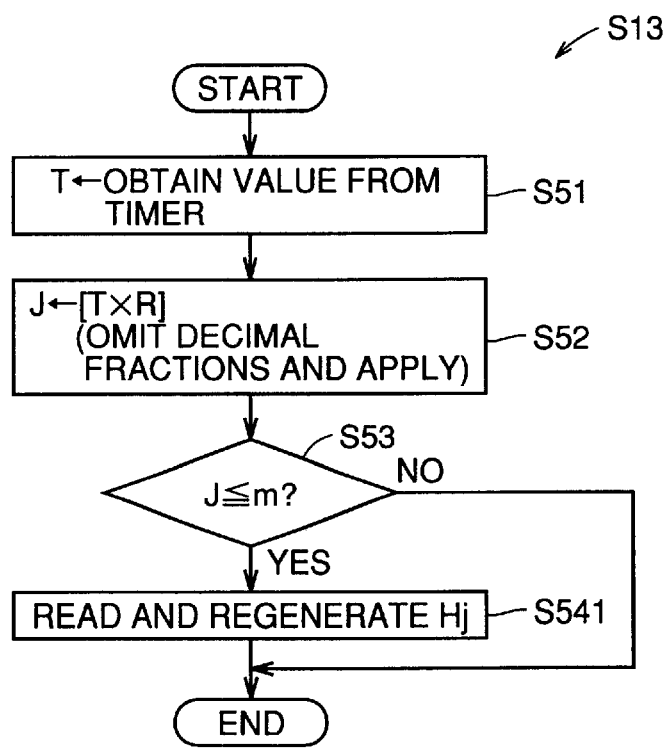
FIG. 11 is a flow chart showing a process of regenerating the guide track information shown in FIG. 10.

A third embodiment will now be described. In the present embodiment, guide track information 105C shown in FIG. 10 is used. Dynamic image information Hj is set in guide track information 105C by one frame. Determination of presenting time information 201i using guide track information 105C is performed in accordance with process flow charts shown in FIGS. 1 and 11. The process flow chart shown in FIG. 11 is different from that in FIG. 7 in that the process of reading and regenerating amplitude information Mj (S54) is changed to a process of reading dynamic image information Hj from guide track information 105C for display on display 603 (S541). The other processes shown in FIG. 11 are the same as those in FIG. 7. A display (regeneration) rate of the dynamic image may also be changed in accordance with the present embodiment.

When image information 202i for the frame of the animation to be created is preliminary set in fiame information group 103, before dynamic image information Hj of one frame which has been read from guide track information 105C is displayed, the image of image information 202i corresponding to that time point and the image for dynamic image information Hj which has been read are synthesized by a frame unit. The synthesized image may be displayed on display 603.

There are mainly two methods of synthesizing one frame for the preliminary recorded dynamic image (hereinafter referred to as image A) and the image of the frame of the animation to be created (hereinafter referred to as image B).

In the first method, a region of the image corresponding to the specific color is defined as transparent for any of images A or B, and information of the other image is transferred to the portion of the transparent image for synthesis. This method is performed either by hardware or software, both being known art called superimpose. Therefore, description thereof will not be given here.

The second method is applied when image B is plotted by a plotting command of a line or a figure such as a polygon. The plotting command for plotting image B is given for a storage region related to information of each pixel of image A. Thus, a synthesized image is created in which image B is written over image A.

These two methods are particularly effective when a character animation, character, arrow or the like are synthesized as image B.

Thus, as the information of the preliminary recorded dynamic image is regenerated at the regeneration rate determined by a preliminary set speed and synthesized with the image for the animation to be created in parallel to passage of time at the preliminary set speed, the synthesized animation can readily be created in synchronization with the dynamic image. Further, the producer can input the timing indication signal when both images are brought into synchronization as desired (synthesized) by verifying the synthesized image displayed on display 603.

Fourth Embodiment

Figure 12:
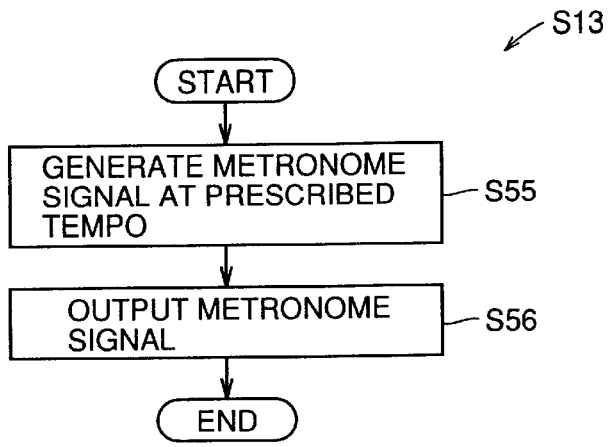
FIG. 12 is a flow chart showing a process of regenerating guide track information according to a fourth embodiment of the present invention.

A fourth embodiment will now be described. In the present embodiment, a metronome signal generated by using timer 106 is used as guide track information. In the present embodiment, a process is performed in accordance with flow charts shown in FIGS. 1 and 12. FIG. 12 shows a process of regenerating guide track information (S13) in FIG. 1. In the process of regenerating the guide track information in FIG. 12, a value of timer 106 is monitored, and a metronome signal is generated and output every time when a prescribed period of time as measured by timer 106 is elapsed (S55, S56). Another methods of generating the metronome signal include a method of obtaining a metronome signal by interrupting a hardware at given intervals by timer 106.

A signal indicating a timing for a boundary between frames of the animation can be input through timing signal inputting portion 107 using thus output metronome signal as a reference. Therefore, even when the animation which is not related to timing information such as sounds are to be created, a motion at an objective speed can be added to the animation. In addition, the creation of the animation for which the overall regenerating time is determined is facilitated. For example, when the motion added to the animation is set in accordance with the metronome signal which is regenerated every second, the signal indicating the timing for the boundary is input for every frame in the time during which thirty metronome signals are regenerated. By setting the boundary between the frames in this way, the animation accurately corresponding to thirty seconds can readily be created.

Various methods are possible for creating and outputting the metronome signal. In any of these methods, the metronome signal is used as a trigger signal, and the producer is provided with a perceptible output signal using sounds, image, light emitting diode 112 or the like.

As described above, sounds, image, light or the like is used to output the metronome signal such that the producer can perceive it (S56). When sounds are used, for example, the metronome signal is directly input to a D/A converter, so that it is converted to a signal as a click sound and output from speaker 604. In addition, there is a method of driving various sound sources 111 using the metronome signal as the trigger signal. An electric signal which is similar to the sound signal of the click sound can be used to drive light emitting diode 112 rather than speaker 604. Further, an outputting manner using image may be employed. In other words, specific image 700 is used as the user interface as shown in FIG. 3, so that a display manner of specific image 700 is changed in display 603 every time the metronome signal is generated. Further, a display manner of specific image 700 may be changed for a specific short period of time after the metronome signal is generated.

Fifth Embodiment

Figure 13:
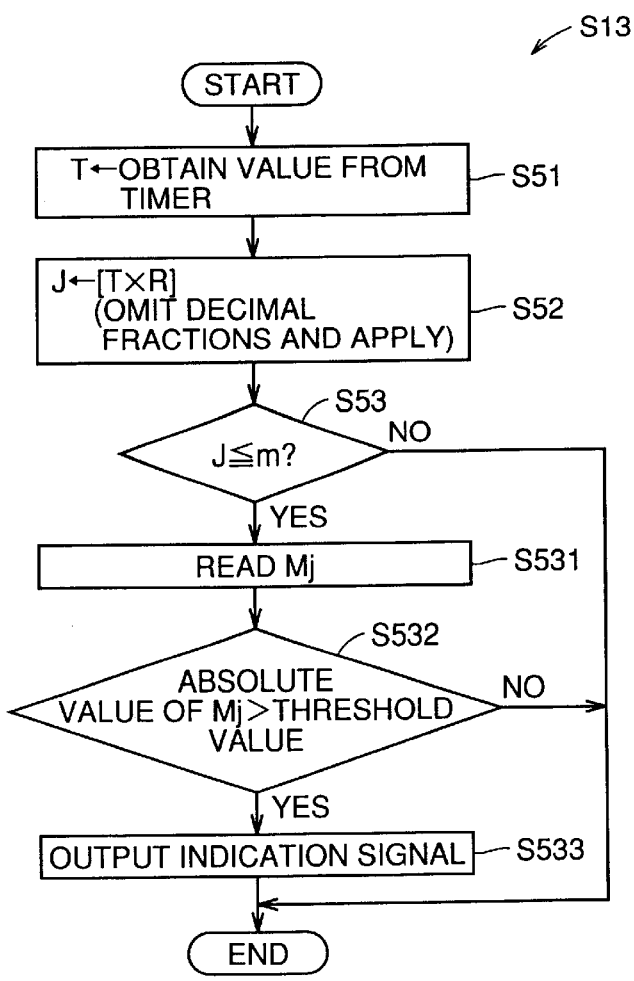
FIG. 13 is a flow chart showing a process of regenerating guide track information according to a fifth embodiment of the present invention.

A fifth embodiment will now be described. In the present embodiment, a process of automatically generating a signal indicating a timing corresponding to a boundary between frames based on guide track information will be described. Here, guide track information 105A including amplitude information Mj of sounds is employed. The process according to the flow chart shown in FIG. 13 is included in the process of regenerating the guide track information (S13) shown in FIG. 5 to enable a process in which the time at which a sound exceeding a certain intensity is output from speaker 604 corresponds to a boundary between the frames. In FIG. 13, when an absolute value of read amplitude information Mj exceeds a prescribed threshold value, a signal indicating a timing is generated (output) (S531 to S533), it is determined if the signal has been output in FIG. 5 (S5). In this case, S4 in FIG. 5 corresponds to S13. Therefore, S4 is not performed in the case of FIG. 5.

Figure 14:
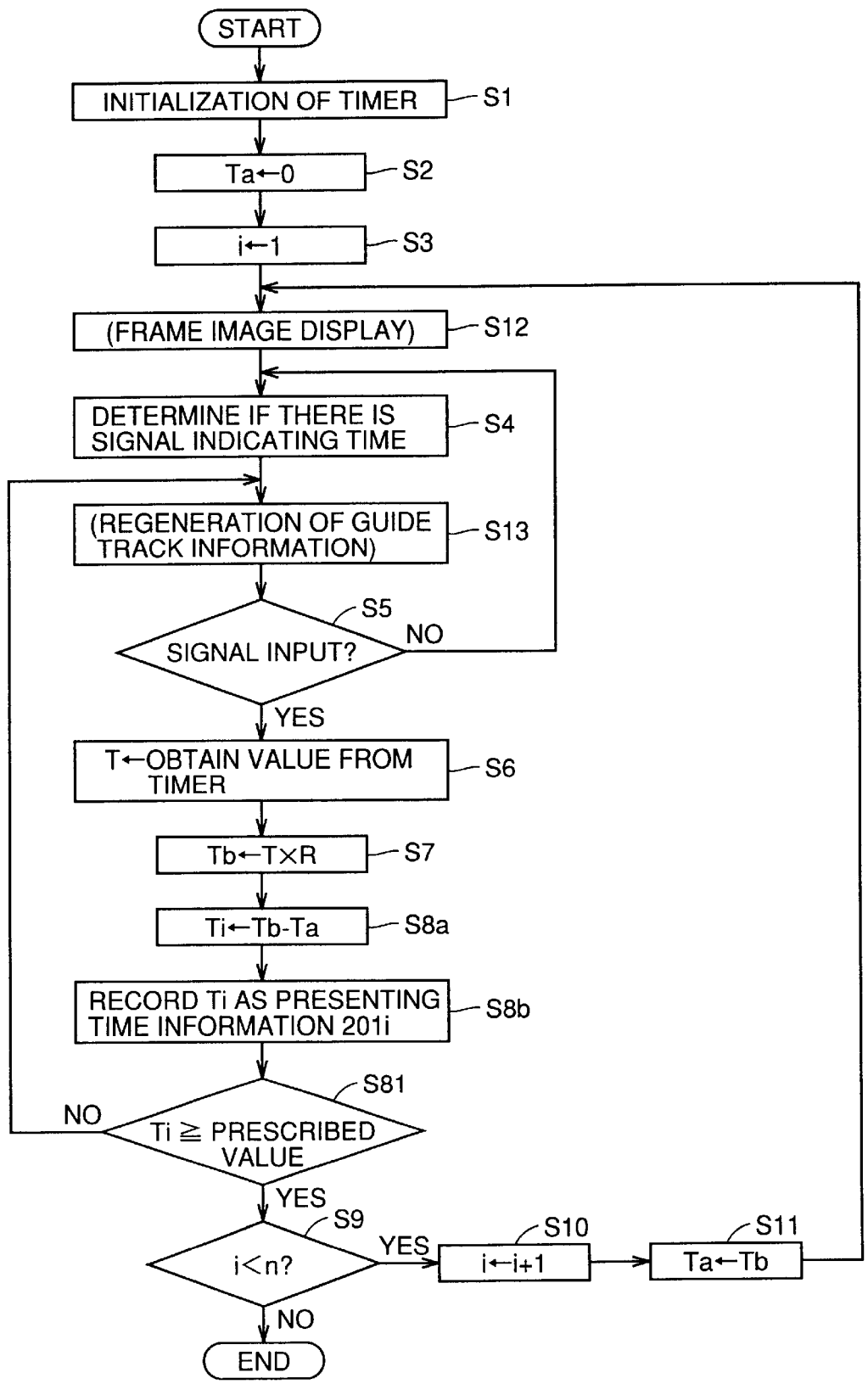
FIG. 14 is another flow chart showing a process of regenerating the guide track information according to the fifth embodiment of the present invention.

The absolute value of amplitude information Mj exceeding a prescribed threshold value may successively be generated due to chattering. Thus, it is necessary to prevent generation of a plurality of signals indicating a timing in a short period of time after the sound exceeding a certain intensity is output. There are several methods to cope with this problem. For example, as shown in FIG. 14, the following process may be added to preventing malfunction. More specifically, in the process shown in FIG. 14, after (Tb−Ta) is calculated, it is determined if the resulting value, that is, a scheduled time for presenting the current frame is smaller than a prescribed value (S81). If it is smaller than the prescribed value, the process does not proceed to S9, but returns to S13.

Sixth Embodiment

Figure 15:
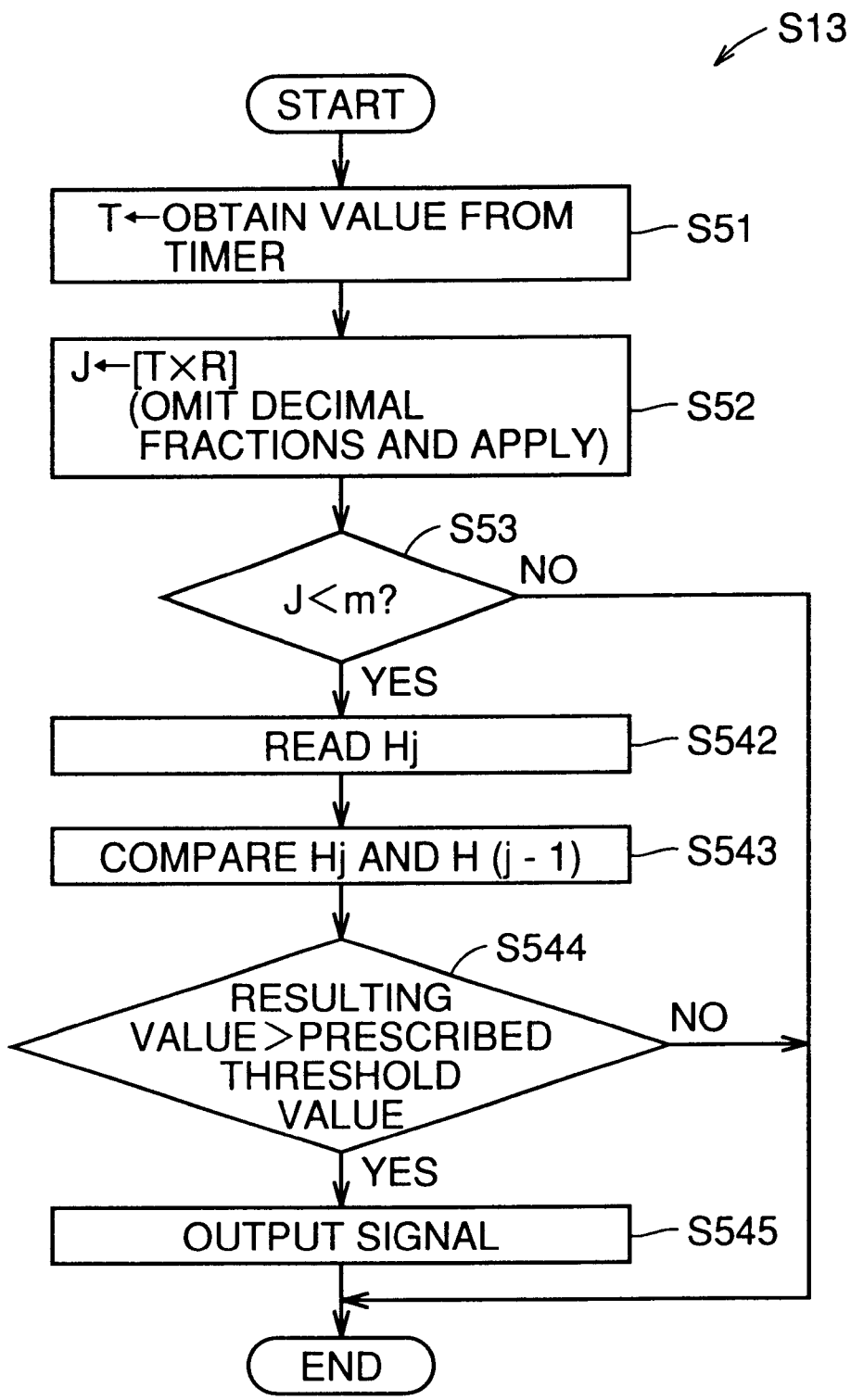
FIG. 15 is a flow chart showing a process of regenerating guide track information according to a sixth embodiment of the present invention.

A sixth embodiment will now be described. In the sixth embodiment, the process in FIG. 15 is included as a process of regenerating guide track information in FIG. 5 (S13) and performed so that the time point at which a shot (a unit of filming) is changed corresponds to a boundary between the frames. In the present embodiment, guide track information 105C including a plurality of dynamic image information Hj in a frame unit is used. In FIG. 15, for each of pixels of read dynamic image information Hj, color information thereof and color information of the corresponding pixel of dynamic image information H (j−1) are compared and the difference therebetween is detected. When an average value of the detected difference exceeds a prescribed threshold value, it is determined that the shot has been changed, so that a timing indication signal is output (S542 to S545). Then, it is determined if the signal has been output in FIG. 5 (S5). It is noted that the color information of each pixel is digital information indicating brightness of three primary colors of light, that is, red, green and blue.

In the present embodiment, S4 in FIG. 5 corresponds to S13. Thus, S4 is not included in FIG. 5.

In the present embodiment, a shot boundary can be automatically and simply determined in accordance with an amount of change of color information for each pixel forming the image. Therefore, according to the present embodiment, the boundary between the frames of the animation is automatically and accurately detected, and corresponding presenting time information 201$i$ is readily be determined for each frame.

Although a signal which has been passed through a filter having a specific condition by S544 is newly input, the inputting method is not limited to the method using the inputting device. The inputting method may be performed by data transmission and reception between modules forming a program in the memory.

Seventh Embodiment

A seventh embodiment will now be described. In the aforementioned sixth embodiment, presenting time information 201$i$ for each frame is determined by a real time process, whereby a processing load of CPU 101 increases and the real time process becomes difficult. When the process is difficult to be performed, the method of the present embodiment is employed.

Figure 16:
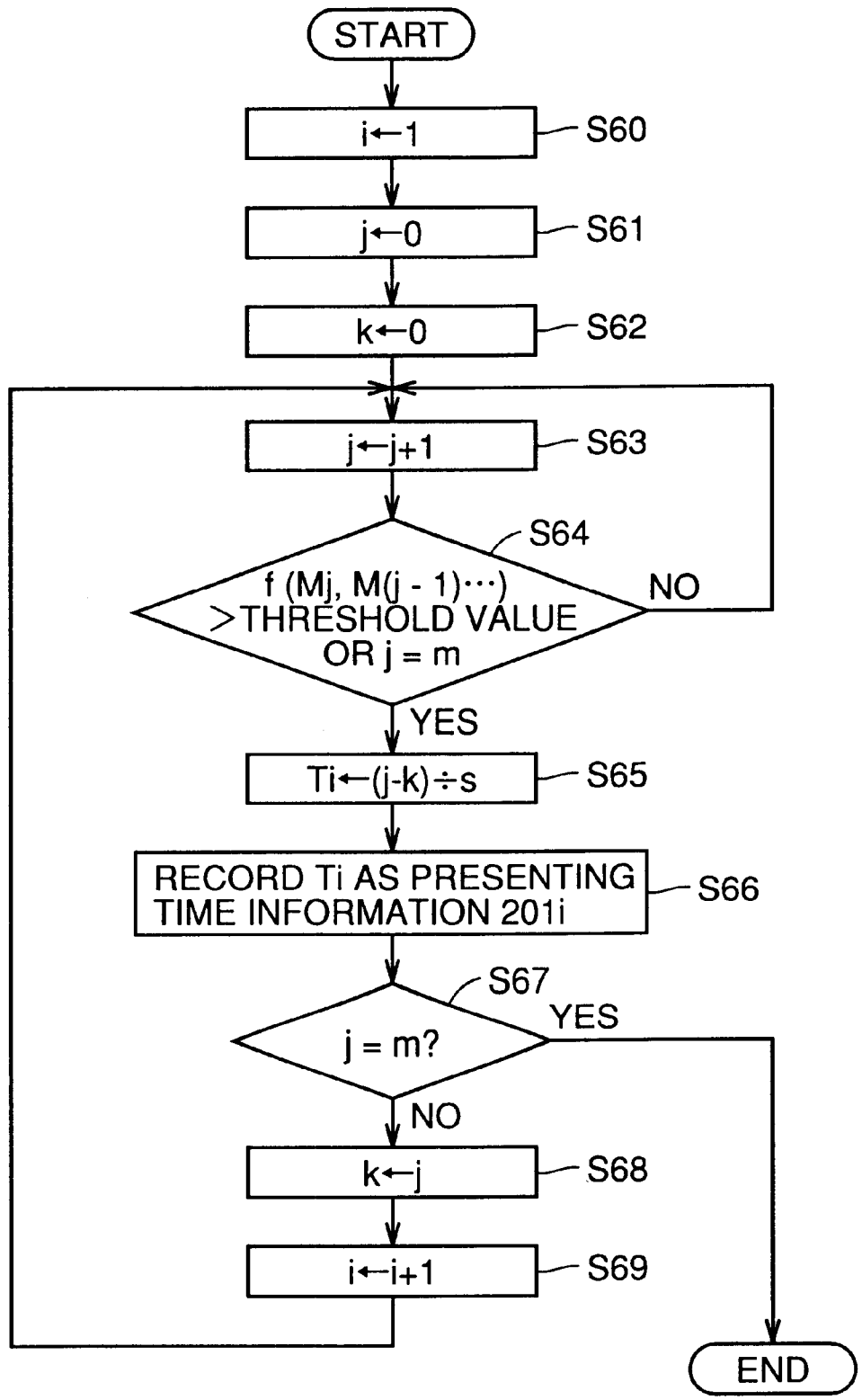
FIG. 16 is a flow chart showing a process of creating an animation according to a seventh embodiment of the present invention.
Figure 17:
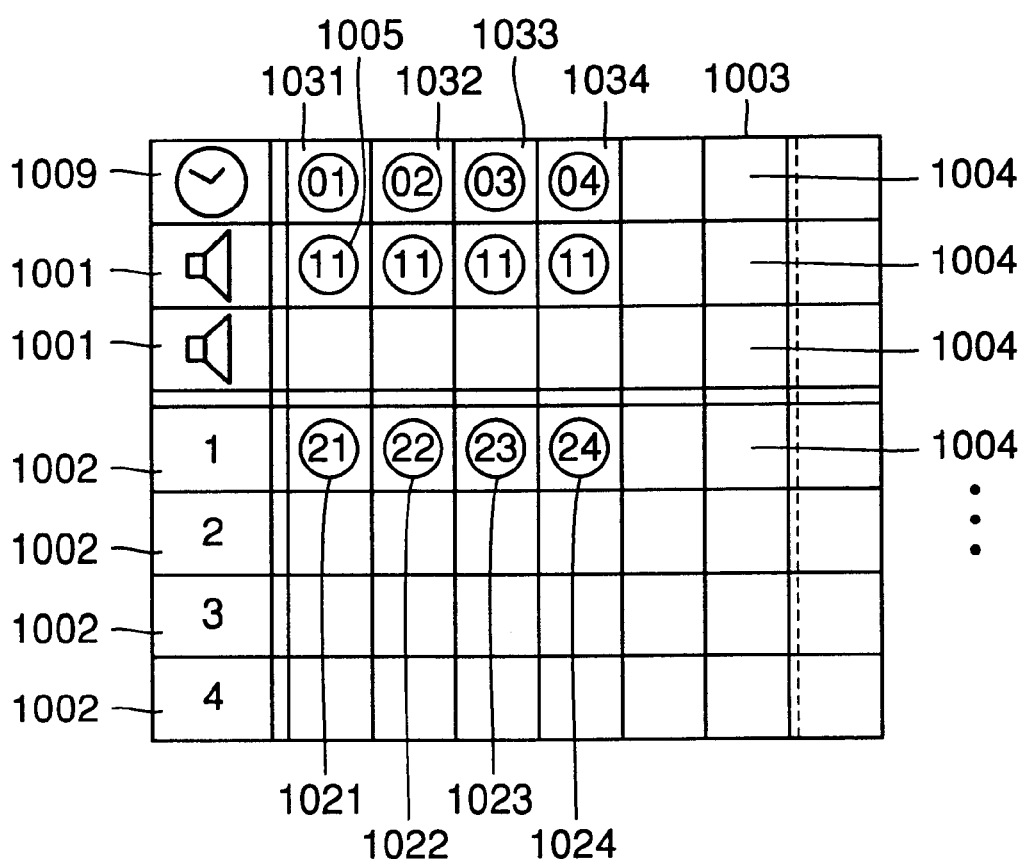
FIG. 17 is a diagram schematically showing a score used in the conventional Director.
Figure 18A:
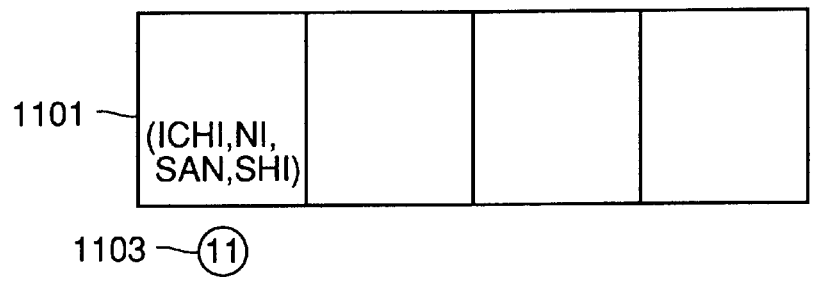
FIGS. 18A and 18B are diagrams schematically showing casts used in the conventional Director.
Figure 18B:
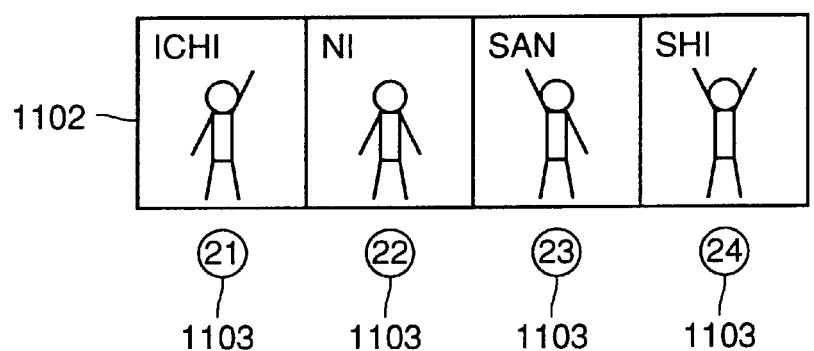
Figure 19:
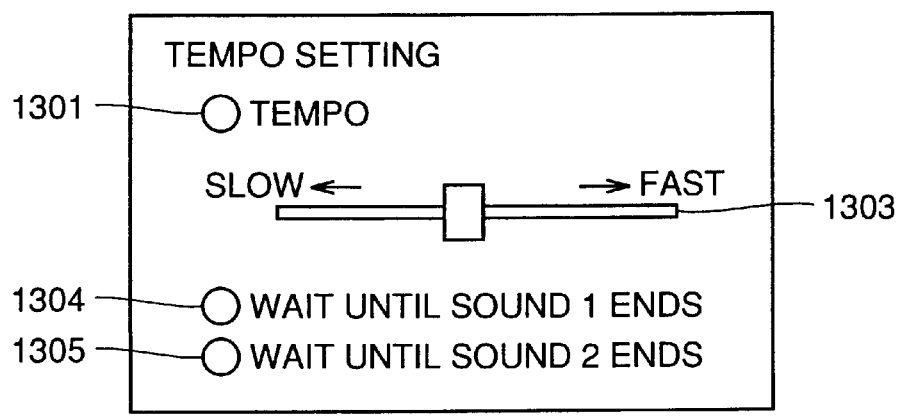
FIG. 19 is a diagram exemplifying a structure of a tempo setting screen layout used in the conventional Director.
Figure 20:
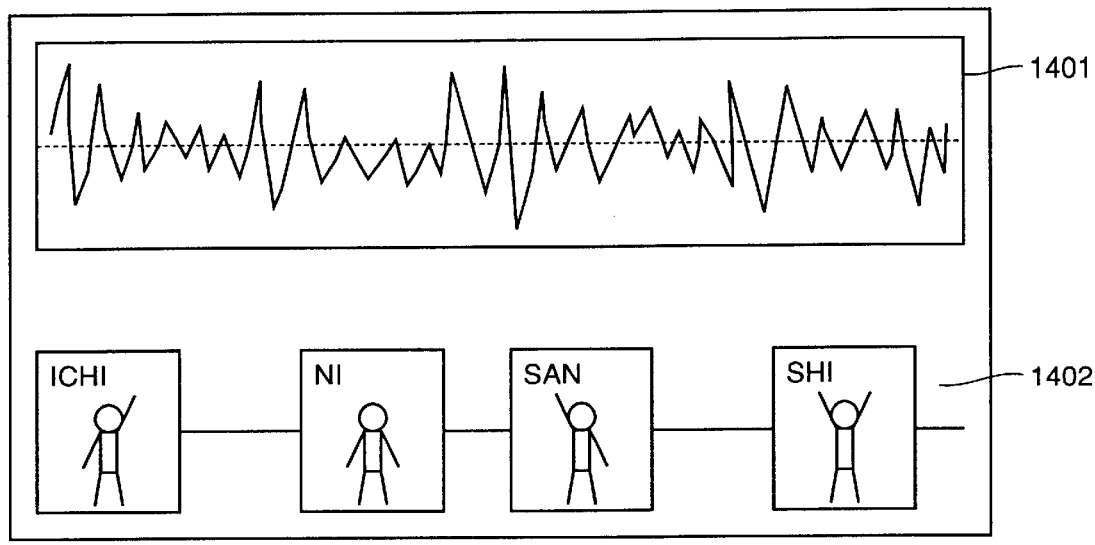
FIG. 20 is a diagram exemplifying a user interface applied to a conventional video editing method.
Figure 21:
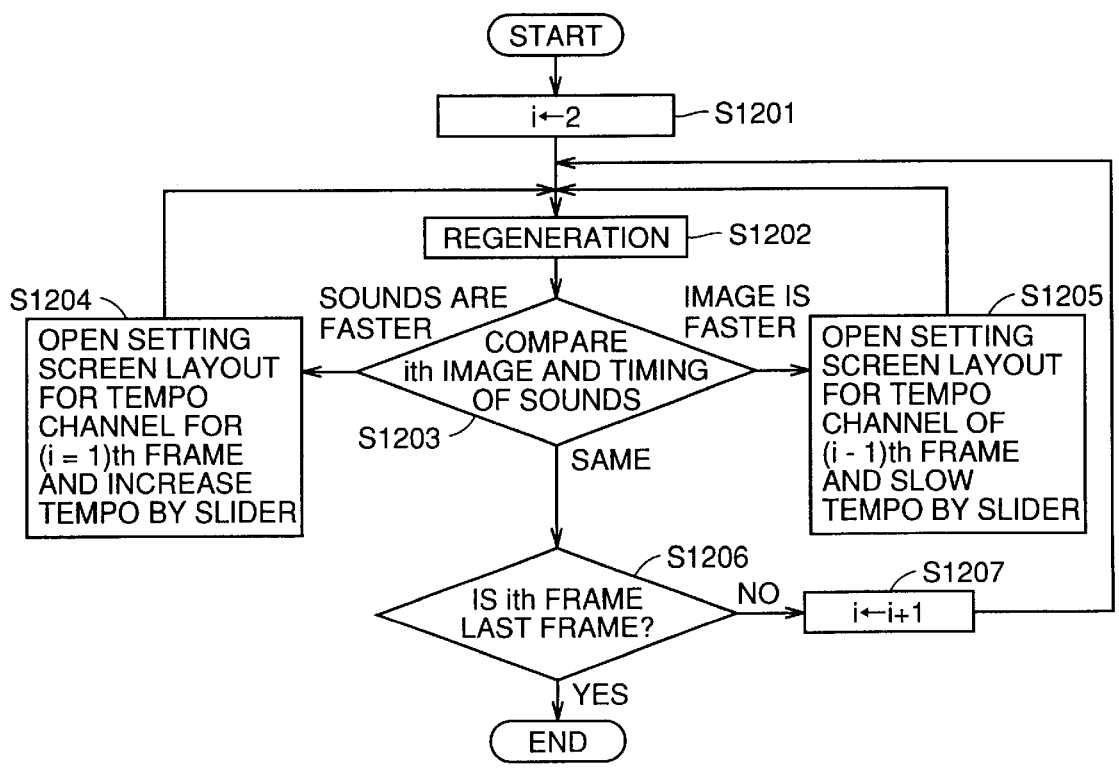
FIG. 21 is a flow chart showing a procedure when synchronization of sound and image data is to be achieved by the conventional Director.

In the present embodiment, by calculation in accordance with the flow chart shown in FIG. 16 rather than the real time process, presenting time information 201$i$ corresponding to each frame is determined and recorded in frame information group 103. Thus, this method is particularly effective when it is difficult to perform the real time process because of the load caused by the extracting process of the timing indication signal.

More specifically, in FIG. 16, a process of extracting information from guide track information 105A is performed by using a filter function f ( ) having a prescribed condition (S64), a position (a position indicated by j) apart from the head of the information extracted from guide track information 105A is obtained by j−k, a value of the obtained position is divided by a unit time s, and the result is set to a variable Ti (S65). Thus, presenting time information 201$i$ for each frame is calculated and set to frame information group 103 (S66). Assume that, for example, a sampling interval of frame information group 103 is 1/30 seconds. Further, suffix letters j for extracted guide track information 105A (information indicating an order of frames in frame information group 103) are 30, 45 and 90 in order. In this case, presenting time information 201*i* for each frame is calculated as (30−0)÷30=1 second, (45−30)÷30=0.5 seconds and (90−45)÷30=1.5 seconds. Thus, presenting time information 201*i* is obtained and recorded in frame information group 103 not in the real time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of creating an animation, comprising:
   an indication signal inputting step of inputting a timing indication signal indicating a timing corresponding to a boundary between adjacent frames for each of a plurality of frames forming said animation;
   an inputting time recording step of temporarily recording a time when said timing indication signal is input by said indication signal inputting step as a presentation ending time for a current frame and as a presentation starting time for a next frame;
   a time determining step of determining, for each of said plurality of frames, a difference between said presentation ending time and said presentation starting time for the frame recorded by said inputting time recording step as a presenting time for the frame; and
   a step of recording information indicating said presenting time determined by said time determining step onto a medium for each of said plurality of frames.

2. The method of creating the animation according to claim 1, wherein said indication signal inputting step includes:
   an information regenerating step of regenerating preliminary recorded guide track information at a regeneration rate in accordance with said arbitrary speed for output; and
   a first signal inputting step of inputting said timing indication signal in accordance with said guide track information output by said information regenerating step for each of said plurality of frames,
   said guide track information being information referenced for identifying said boundary for each of said plurality of frames.

3. The method of creating the animation according to claim 1, wherein said plurality of frames are key frames.

4. The method of creating the animation according to claim 2, wherein said plurality of frames are key frames.

5. The method of creating the animation according to claim 2, wherein said guide track information is related to a sound.

6. The method of creating the animation according to claim 2, wherein said guide track information relates to dynamic image information,
   and said information regenerating step includes:
      an image synthesizing and displaying step of synthesizing said dynamic image information with each of said plurality of frames by every frame for display while regenerating it at a regeneration rate in accordance with said arbitrary speed.

7. The method of creating the animation according to claim 2, wherein said guide track information indicates said passage of time at said arbitrary speed, and said information regenerating step includes the step of generating and outputting a metronome signal having a prescribed tempo in accordance with information indicating said passage of time.

8. A method of creating an animation, comprising in passage of time at an arbitrary speed:
   an indication signal inputting step of inputting a timing indication signal indicating a timing corresponding to a boundary between adjacent frames for each of a plurality of frames forming said animation;
   a time determining step of determining a presenting time during which each of said plurality of frames is presented to said animation in accordance with said timing indication signal input by said indication signal inputting step; and
   a step of recording information indicating said presenting time determined by said time determining step onto a medium for each of said plurality of frames;
   wherein said indication signal inputting step includes:
      an information regenerating step of regenerating preliminary recorded guide track information at a regeneration rate in accordance with said arbitrary speed for output; and
      a first signal inputting step of inputting said timing indication signal in accordance with said guide track information output by said information regenerating step for each of said plurality of frames,
      said guide track information being information referenced for identifying said boundary for each of said plurality of frames; and
   wherein said information regenerating step includes:
      a first step of regenerating said preliminary recorded guide track information at said regeneration rate in accordance with said arbitrary speed; and
      a second step of inputting said guide track information regenerated by said first step for outputting it as said timing indication signal through a filter having a prescribed extracting condition.

9. A method of creating an animation comprising:
   a part determining step of determining corresponding partial information of guide track information using said guide track information output through a filter having an arbitrary extracting condition for each of a plurality of frames forming said animation;
   a presenting time determining step of determining a time during which each of said plurality of frames is presented to said animation in accordance with the said partial information determined by said part determining step; and
   a recording step of recording information indicating the presenting time determined by said presenting time determining step onto a medium for each of said plurality of frames,
   said guide track information being referenced for identifying a boundary between adjacent frames for each of said plurality of frames.

10. The method of creating the animation according to claim 9, wherein said plurality of frames are key frames.

11. An apparatus for creating an animation, comprising:
    indication signal inputting means of inputting a timing indication signal indicating a timing corresponding to a boundary between adjacent frames for each of a plurality of frames forming said animation;
    inputting time recording means of temporarily recording a time when said timing indication signal is input by said indication signal inputting step as a presentation ending time for a current frame and as a presentation starting time for a next frame;

time determining means for determining, for each of said plurality of frames, a difference between said presentation ending time and said presentation starting time for the frame recorded by said inputting time recording step as a presenting time for the frame; and recording means for recording information indicating said presenting-time determined by said time determining means onto a medium for each of said plurality of frames.

12. A computer-readable recording medium in which an animation creation program for executing with a computer an animation creating method is recorded, said animation creating method comprising:

an indication signal inputting step of inputting a timing indication signal indicating a timing corresponding to a boundary between adjacent frames for each of a plurality of frames forming said animation;

an inputting time recording step of temporarily recording a time when said timing indication signal is input by said indication signal inputting step as a presentation ending time for a current frame and as a presentation starting time for a next frame;

a time determining step of determining, for each of said plurality of frames, a difference between said presentation ending time and said presentation starting time for the frame recorded by said inputting time recording step as a presenting time for the frame; and a step of recording information indicating said presenting time determined by said time determining step onto a medium for-each of said plurality of frames.

* * * * *